United States Patent [19]
Harandi et al.

[11] Patent Number: 5,030,338
[45] Date of Patent: Jul. 9, 1991

[54] CONVERSION PROCESS USING DIRECT HEATING

[75] Inventors: Mohsen N. Harandi, Lawrenceville; Hartley Owen, Belle Mead, both of N.J.

[73] Assignee: Mobil Oil Corp., Fairfax, Va.

[21] Appl. No.: 269,087

[22] Filed: Nov. 9, 1988

[51] Int. Cl.⁵ .................. C10G 35/095; C10G 35/14; C07C 5/333; B01J 29/38

[52] U.S. Cl. ........................ 208/135; 208/136; 208/137; 208/140; 208/149; 208/164; 502/21; 502/41; 585/402; 585/407; 585/419; 585/420; 585/659; 585/660; 585/661

[58] Field of Search .................... 502/21, 41, 42; 208/140, 149, 160, 164, 135, 136, 137; 585/402, 407, 419, 420, 659, 660

[56] References Cited

U.S. PATENT DOCUMENTS

| | | | |
|---|---|---|---|
| 2,441,170 | 5/1948 | Rose et al. | 502/21 |
| 2,506,307 | 5/1950 | Martin | 502/41 |
| 2,582,246 | 1/1952 | Garbo | 208/149 |
| 2,721,167 | 10/1955 | Nicholson | 208/149 |
| 2,763,595 | 9/1956 | Fritz | 196/50 |
| 2,763,596 | 9/1956 | Feldbauer et al. | 196/50 |
| 2,763,597 | 9/1956 | Martin et al. | 196/50 |
| 2,844,522 | 7/1958 | Rex et al. | 208/149 |
| 2,846,364 | 8/1958 | Welty, Jr. | 208/140 |
| 2,856,351 | 10/1958 | Welty, Jr. et al. | 208/140 |
| 2,861,947 | 11/1958 | Nicholson | 208/149 |
| 2,913,392 | 11/1959 | Ricards | 208/73 |
| 4,515,092 | 5/1985 | Walsh et al. | 110/347 |

Primary Examiner—Paul E. Konopka
Attorney, Agent, or Firm—Alexander J. McKillop; Charles J. Speciale; Robert B. Furr, Jr.

[57] ABSTRACT

A process and apparatus are disclosed for the catalytic conversion of hydrocarbons in a transport or sub-transport fluidized bed reaction zone. Inert particles are used to transfer heat to the reaction zone. The particles may be heated separately from the catalyst in a combustion zone or together with the catalyst in a regenerator. Fuel is fired to heat the inert particles or a mixture of catalyst and inert particles. Hydrogen deficient fuels such as charcoal or coke are preferred.

24 Claims, 4 Drawing Sheets

CONVERSION PROCESS USING DIRECT HEATING

BACKGROUND OF THE INVENTION

This invention relates to the field of catalytic conversion of hydrocarbons in a fluidized bed reaction zone. More particularly, the invention relates to directly transferring heat to a catalytic aromatization or dehydrogenation reaction zone by circulating catalyst, inert particles or both through a combustion zone and then through a catalytic reaction zone.

Heat transfer via inert particles has been used in catalytic conversion processes. For example, U.S. Pat. No. 2,763,596 to Feldbauer et al. describes reforming in a mixture of catalyst and inert heat transfer solid, with a solids elutriation step. Feldbauer is, however, directed to the reforming of a naphtha range feed. In contrast, the present invention is directed to the dehydrogenation or aromatization of a $C_2$–$C_5$ aliphatic stream.

U.S. Pat. No. 2,913,392 to Richards describes a process which combines a first step of catalytic cracking with a second step of noncatalytic thermal cracking. Product from the first step is subjected to noncatalytic thermal cracking in the presence of inert solids.

U.S. Pat. No. 2,763,595 to Fritz describes a reforming process in which the catalyst regeneration reaction is used to heat circulating inert solids. No suggestion is made of using a supplemental fuel source.

U.S. Pat. No. 2,763,597 to Martin et al. discloses a reforming process in which heat evolved from catalyst regeneration is transferred to the reactor by a mixture of circulating catalyst and inert solids. The Martin reference makes no mention of using supplemental fuel and additionally uses steam to strip product from the mixture of inert solids and catalyst. Contact with water vapor at elevated temperatures causes steaming deactivation of many catalysts useful for aromatization.

Unlike a fluidized catalytic cracking (FCC) process, the fluidized bed catalytic aromatization of an aliphatic feedstream does not generally operate in a heat balanced mode. That is to say that in the operation of a heat balanced process, e.g. FCC, the thermal energy released during regeneration by the combustion of coke deposited on the catalyst equals or exceeds the endothermic heat of reaction required for the conversion step. In contrast, catalytic aromatization of $C_2$–$C_5$ aliphatic hydrocarbons does not produce sufficient coke to supply its own endothermic heat of reaction. Consequently, design routes previously favored were moving- or fixed-bed operation using a fired heater and fluidized bed operation using an external process heat source. As can be seen by one skilled in the art, these designs have inherent limitations. Preheating the feedstock to reaction temperature in a fired heater causes undesirable side reactions including the formation of coke in the heater tubes. Fixed bed reactors require periodic regeneration and fluidized bed reactors using a second process unit as a heat source require close proximity of process streams available for cooling at initial temperatures above 1000° F. Further, preheating catalyst to high temperatures to supply the heat of reaction in a fluidized-bed system has been found to accelerate catalyst deactivation.

SUMMARY OF THE INVENTION

The invention improves heat transfer to a high temperature fluidized bed catalytic reaction zone by firing supplemental fuel to heat inert particles alone in a separate combustion chamber, or together with catalyst in a regenerator. The invention includes a process and apparatus for the conversion of a hydrocarbon feedstream in a fluidized bed reaction zone. The endothermic heat of reaction is transferred to the fluidized bed reaction zone by a mixture of catalyst and inert solids.

The process of the present invention is particularly useful for converting a hydrocarbon stream rich in aliphatics to a hydrocarbon stream rich in olefins or aromatics. In a first embodiment, a mixture of finely divided inert particles and finely divided catalyst particles is maintained in a sub-transport regime in a reaction zone. A predominately aliphatic hydrocarbon feedstock is charged to the reaction zone and is converted to a predominately olefinic or aromatic product stream. A mixture of deactivated catalyst and inert particles is withdrawn from the reaction zone and stripped of entrained hydrocarbon. The stripped mixture is then charged to a regeneration zone where supplemental fuel is added to the mixture. Regeneration gas containing oxygen is introduced into the regeneration zone to regenerate the deactivated catalyst and to heat the mixture of catalyst and inert particles by burning both the coke deposited on the catalyst and the supplemental fuel added to the mixture. The hot regenerated catalyst and inert particles are then withdrawn from the regeneration zone and recycled to the inlet of the reaction zone where they are mixed with fresh feedstock.

In the second and third embodiments, the stripped mixture of catalyst and inert particles is separated. The inert particles are charged to a combustion zone where supplemental fuel is burned to heat the inert particles, while the deactivated catalyst is charged to a regeneration zone to burn off coke under less severe conditions.

In the fourth embodiment, catalyst and inert particles are circulated together as in the first embodiment but, in contrast, the reaction is carried out in a transport regime in a riser reactor.

Catalytic reactions such as dehydrogenation and aromatization may be carried out in a fluidized reaction zone maintained in either a transport or a sub-transport regime. The first three embodiments set forth below describe the invention as it is applied to the operation of a sub-transport fluidized reaction zone. The fourth embodiment describes the invention in terms of its application to a fluidized reaction zone, maintained in a transport regime. It is to be understood that the various configurations set forth in conjunction with the sub-transport reaction zone may easily be applied to use with a transport reaction zone.

The invention includes a process for the conversion of hydrocarbon feedstock comprising the steps of maintaining a reaction zone containing a fluidized bed of finely divided inert particles and finely divided catalyst particles at conversion conditions, charging hydrocarbon feedstock to the reaction zone, withdrawing a mixture of deactivated catalyst and inert particles from the reaction zone, stripping entrained hydrocarbon from the mixture of deactivated catalyst and inert particles, charging the stripped mixture of catalyst and inert particles to a regeneration zone, flowing a supplemental fuel into the regeneration zone, introducing a sufficient amount of oxygen into the regeneration zone to regenerate the deactivated catalyst and to burn the supplemental fuel, withdrawing regenerated catalyst and inert particles from the regeneration zone, and mixing the regenerated catalyst and the inert particles with the hydrocarbon feedstock.

The invention further includes an apparatus for the conversion of hydrocarbon feedstock comprising reactor means for maintaining a reaction zone containing a fluidized bed of finely divided inert particles and finely divided catalyst particles at conversion conditions, means for charging hydrocarbon feedstock to the reaction zone, means for withdrawing a mixture of deactivated catalyst and inert particles from the reaction zone, stripping means for separating entrained hydrocarbon from the mixture of deactivated catalyst and inert particles, means for charging the stripped mixture of catalyst and inert particles to a regeneration zone, means for flowing a supplemental fuel into the regeneration zone, means for introducing a sufficient amount of oxygen into the regeneration zone to regenerate the deactivated catalyst and to burn the supplemental fuel, means for withdrawing the regenerated catalyst and inert particles from the regeneration zone, and means for mixing the regenerated catalyst and the inert particles with the hydrocarbon feedstock.

The invention also comprises a process for the conversion of hydrocarbon feedstock including the steps of maintaining a reaction zone containing a fluidized bed of finely divided inert particles and finely divided catalyst particles at conversion conditions, charging hydrocarbon feedstock to the reaction zone, withdrawing a mixture of deactivated catalyst and inert particles from the reaction zone, stripping entrained hydrocarbon from the mixture of deactivated catalyst and inert particles, separating the stripped mixture of deactivated catalyst and inert particles into a first stream predominately containing catalyst and a second stream predominately containing inert particles, charging the first stream predominately containing catalyst to a regeneration zone, introducing an amount of oxygen-containing gas into the regeneration zone sufficient to regenerate the deactivated catalyst and to maintain the catalyst in a state of sub-transport fluidization, charging the second stream predominately containing inert particles to a combustion zone, flowing a supplemental fuel into the combustion zone, heating the inert particles in the combustion zone by introducing an amount of an oxygen-containing gas into the combustion zone sufficient to maintain the inert particles in a state of sub-transport fluidization and to burn the supplemental fuel yielding an oxygen-containing flue gas, withdrawing the regenerated catalyst from the regeneration zone, withdrawing the heated inert particles from the combustion zone, and mixing the regenerated catalyst with the hydrocarbon feedstock, and mixing the heated inert particles with the hydrocarbon feedstock.

The invention further comprises an apparatus for the conversion of hydrocarbon feedstock including means for maintaining a reaction zone containing a fluidized bed of finely divided inert particles and finely divided catalyst particles at conversion conditions, means for charging hydrocarbon feedstock to the reaction zone, means for withdrawing a mixture of deactivated catalyst and inert particles from the reaction zone, means for stripping entrained hydrocarbon from the mixture of deactivated catalyst and inert particles, means for separating the stripped mixture of deactivated catalyst and inert particles into a first stream predominately containing catalyst and a second stream predominately containing inert particles, means for charging the first stream predominately containing catalyst to a regeneration zone, means for introducing an amount of oxygen-containing gas into the regeneration zone sufficient to regenerate the deactivated catalyst and to maintain the catalyst in a state of sub-transport fluidization, means for charging the second stream predominately containing inert particles to a combustion zone, means for flowing a supplemental fuel into the combustion zone, means for heating the inert particles in the combustion zone by introducing an amount of an oxygen-containing gas into the combustion zone sufficient to maintain inert particles in a state of sub-transport fluidization and to burn the supplemental fuel yielding an oxygen-containing flue gas, means for withdrawing the regenerated catalyst from the regeneration zone, means for withdrawing the heated inert particles from the combustion zone, means for mixing the regenerated catalyst with the hydrocarbon feedstock, and means for mixing the heated inert particles with the hydrocarbon feedstock.

DETAILED DESCRIPTION

Figure 1:
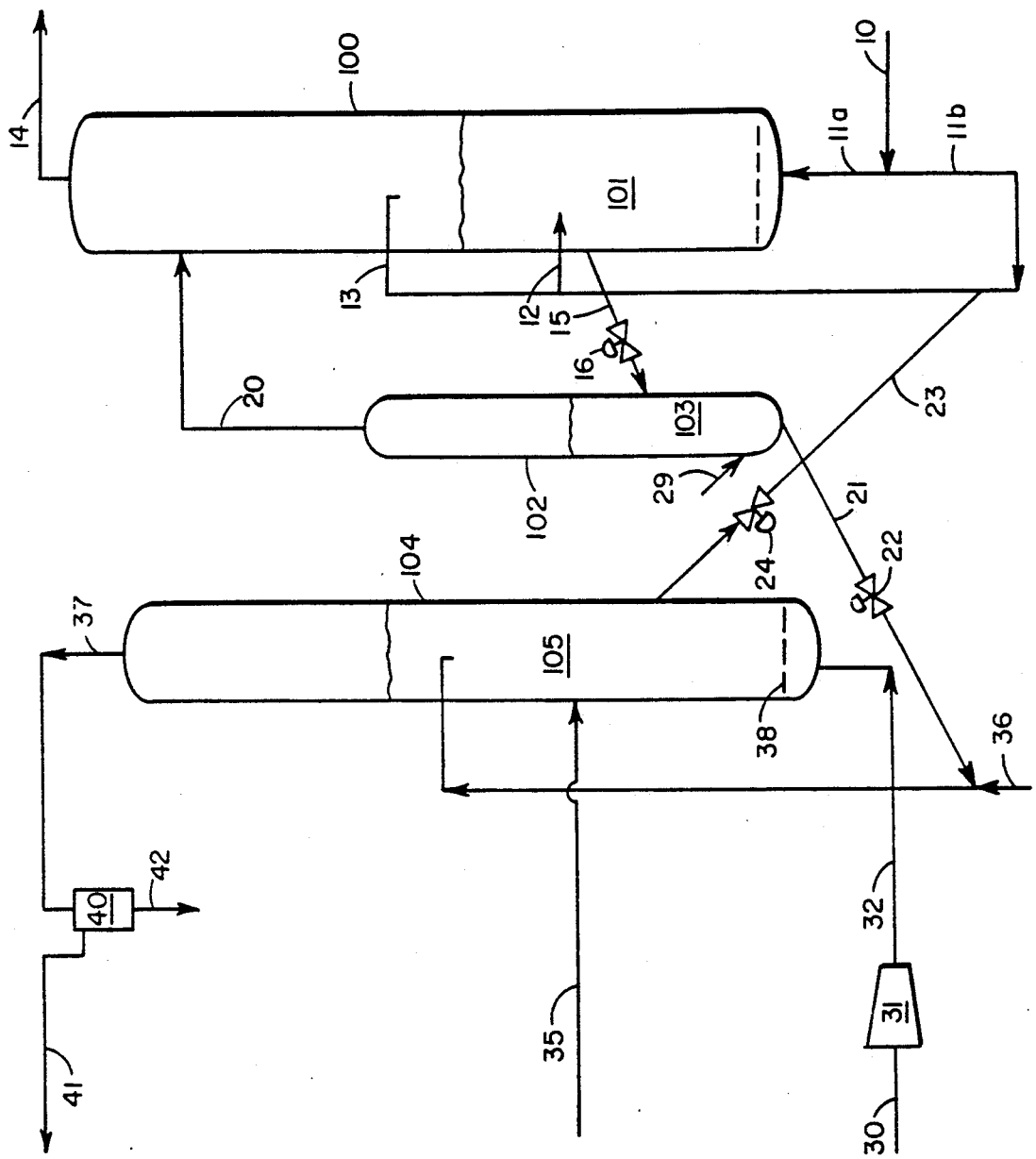
FIG. 1 is a simplified schematic of a first embodiment of the present invention in which supplemental fuel is burned in the regenerator.

The hydrocarbon upgrading processes most useful in conjunction with the present invention include paraffin dehydrogenation and aliphatic aromatization. Medium-pore crystalline zeolites may catalyze both reactions while metals on inert supports predominately catalyze the dehydrogenation reaction.

Catalysts

The members of the class of zeolites useful herein have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolite ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732 discloses Constraint Index values for typical zeolite materials and is incorporated by reference as if set forth at length herein.

In a preferred embodiment, the catalyst is a zeolite having a Constraint Index of between about 1 and about 12. Examples of such zeolite catalysts include ZSM-5, ZSM-11, ZSM-12, ZSM-22, ZSM-23, ZSM-35 and ZSM-48.

Zeolite ZSM-5 and the conventional preparation thereof are described in U.S. Pat. No. 3,702,886, the disclosure of which is incorporated herein by reference. Other preparations for ZSM-5 are described in U.S. Pat. Nos. Re. 29,948 (highly siliceous ZSM-5); 4,100,262 and 4,139,600, the disclosure of these is incorporated herein by reference. Zeolite ZSM-11 and the conventional preparation thereof are described in U.S. Pat. No. 3,709,979, the disclosure of which is incorporated herein by reference. Zeolite ZSM-12 and the conventional preparation thereof are described in U.S. Pat. No. 3,832,449, the disclosure of which is incorporated herein by reference. Zeolite ZSM-23 and the conventional preparation thereof are described in U.S. Pat. No. 4,076,842, the disclosure of which is incorporated herein by reference. Zeolite ZSM-35 and the conventional preparation thereof are described in U.S. Pat. No. 4,016,245, the disclosure of which is incorporated herein by reference. Another preparation of ZSM-35 is described in U.S. Pat. No. 4,107,195, the disclosure of which is incorporated herein by reference. Zeolite ZSM-48 and the preparation thereof are taught in U.S. Pat. No. 4,375,573, the disclosure of which is incorporated herein by reference.

Gallium-containing zeolite catalysts are particularly preferred for use in the present invention and are disclosed in U.S. Pat. No. 4,350,835 and U.S. Pat. No. 4,686,312, both of which are incorporated by reference as if set forth at length herein.

Zinc-containing zeolite catalysts are useful in the present invention, for example, U.S. Pat. No. 4,392,989 and U.S. Pat. No. 4,472,535, both of which are incorporated by reference as if set forth at length herein.

Catalysts such as ZSM-5 combined with a Group VIII metal described in U.S. Pat. No. 3,856,872, incorporated by reference as if set forth at length herein, are also useful in the present invention.

Paraffin dehydrogenation catalysts also include oxides and sulfides of Groups IVA, VA, VIA, VIIA and VIIIA and mixtures thereof on an inert support such as alumina or silica-alumina. Thus dehydrogenation may be promoted by sulfides and oxides of titanium, zirconium, vanadium, niobium, tantalum, chromium, molybdenum, tungsten and mixtures thereof. Oxides of chromium alone or in conjunction with other catalytically active species have been shown to be particularly useful in dehydrogenation. Other catalytically active compounds include sulfides and oxides of manganese, iron, cobalt, rhodium, iridium, nickel, palladium, platinum and mixtures thereof.

The above-listed metals of Groups IVA, VA, VIA, VIIA and VIIIA may also be exchanged onto zeolites to provide a zeolite catalyst having dehydrogenation activity. Platinum has been found to be particularly useful for promoting dehydrogenation over zeolite catalysts.

The article "M2 Forming-A Process for Aromatization of Light Hydrocarbons" by N. Y. Chen and T. Y. Yan 25 *Ind. Eng. Chem Process Des. Dev.* 151, 1988, provides an overview of dehydrogenation and aromatization reactions and process conditions, and is incorporated by reference as if set forth at length herein.

FEED COMPOSITION AND PROCESS CONDITIONS

Hydrocarbon upgrading reactions compatible with the process of the present invention include the conversion of aliphatic hydrocarbons to aromatic and/or olefinic hydrocarbons.

U.S. Pat. No. 3,760,024, incorporated by reference as if set forth at length herein, teaches a process for the preparation of aromatic compounds involving contacting a feed consisting essentially of $C_2$–$C_4$ paraffins and/or olefins with a crystalline aluminosilicate, e.g. ZSM-5.

The following representative U.S. patents detail the feed compositions and process conditions for these reactions.

U.S. Pat. No. 3,756,942, incorporated by reference as if set forth at length herein, discloses a process for the preparation of aromatic compounds in high yields which involves contacting a particular feed consisting essentially of mixtures of paraffins and/or olefins, and/or naphthenes with a crystalline aluminosilicate, e.g. ZSM-5, under conditions of temperature and space velocity such that a significant portion of the feed is converted directly into aromatic compounds.

U.S. Pat. No. 3,759,821, incorporated by reference as if set forth at length herein, discloses a process for upgrading catalytically cracked gasoline.

U.S. Pat. No. 3,760,024, incorporated by reference as if set forth at length herein, teaches a process for the preparation of aromatic compounds involving contacting a feed consisting essentially of $C_2$–$C_4$ paraffins and/or olefins with a crystalline aluminosilicate, e.g. ZSM-5.

U.S. Pat. No. 4,746,762 to Avidan et al., incorporated by reference as if set forth at length herein, details the operation of a fluidized-bed aromatization reaction zone.

FIRST EMBODIMENT

In a first embodiment of the present invention, an inert particulate having approximately the same fluidization characteristics as the catalyst is circulated as a heat transfer medium. Referring now to FIG. 1, a hydrocarbon feed, typically a $C_2$–$C_5$ aliphatic hydrocarbon feedstream, is charged through line 10 to feed headers 11a and 11b. A portion of the feed from line 10 travels through feed header 11a into a dense bed of catalyst 101 in the bottom of reactor vessel 100. The balance of the feedstream flows through header 11b and is blended with a controlled amount of hot regenerated catalyst flowing from line 23 which is equipped with flow control valve 24. Regenerated catalyst enters header 11b at a temperature between about 480° C. and 650° C. (900° F. and 1200° F.), typically about 600° C. (1100° F.). The hydrocarbon feed vaporizes upon mixing with the catalyst and flows into reactor 100 through inlet nozzles 12 or 13. Inlet nozzle 12 injects the catalyst/feedstock mixture into the dense bed of fluidized catalyst 101. Inlet nozzle 13, on the other hand, injects the mixture into the reactor 100 above the level of the dense bed 101. Product flows out of reactor 100 through line 14 and is sent to a separation section for recovery of valuable products. Cyclone separators (not shown) may be positioned inside reactor 100 near the top to separate entrained catalyst from the reaction products. Sintered metal filters may also be installed in line 14 to further remove catalyst fines from the product stream.

Spent catalyst is withdrawn from reactor 100 via standpipe 15 which is equipped with a flow control valve 16. Withdrawn spent catalyst is charged to a dense bed of fluidized catalyst 103 in stripper 102. A sufficient amount of inert gas, e.g. nitrogen, flows through line 29 to the bottom of the stripper 102 to maintain the mixture of catalyst and inert particles in a state of sub-transport fluidization. A mixture of stripped hydrocarbon product and inert gas exits the stripper 102 through line 20 and is charged back to reactor 100 at a point above the level of the dense bed. Stripped spent catalyst flows from the lower section of stripper 102 through line 21 to line 36. Line 21 is equipped with flow control valve 22.

A lift gas which may optionally contain oxygen flowing through line 36 mixes with the deactivated catalyst from line 22 and flows to the regenerator 104 where it is charged to the dense bed 105.

Supplemental fuel is fed to the regenerator 104 through line 35. The fuel may be fuel gas, fuel oil, charcoal and/or coke. To minimize steam deactivation of the catalyst in the regenerator, hydrogen-deficient fuels such as charcoal or coke are preferred. Further, it is preferred to minimize the sulfur and nitrogen content of the fuel to reduce the level of catalyst poisons in the system.

Regeneration air flows through line 30 to compressor 31 where it is compressed to about 310 kPa to 380 kPa (30 to 40 psig). The air is then charged through line 32 to the bottom of regenerator 105. The regeneration air may optionally flow through an air distributor grid 38 before it enters the dense bed of catalyst 105 maintained in regenerator 104.

Supplemental fuel and regeneration air charge rates are regulated to maintain regenerator temperature between about 480° C. and 650° C. (900° F. and 1200° F.), preferably around 600° C. (1100° F.). The regenerator 104 may be equipped with one or more cyclone separators (not shown) positioned near the top of the vessel to separate entrained catalyst from flue gas.

Flue gas is withdrawn from regenerator 104 through line 37 and passes through one or more sintered metal filters 40. Filtered flue gas flows through line 41 to a heat recovery section, e.g. steam generation. Flue gas flow is periodically reversed to strip catalyst fines off the filter elements, carrying the fines out of the sintered metal filter via line 42. If more than one filter is used, the filters are typically piped and valved in parallel such that one or more filters may be back-flushed while one or more filters continue in operation. Cyclone separators may also be used alone or in conjunction with the sintered metal filters.

SECOND AND THIRD EMBODIMENT

In the second and third embodiments of the present invention, the inert particles and the catalyst have different fluidization characteristics. The following description is directed to the case in which the catalyst particles fluidize more readily than the inert particles.

By appropriate selection of one or more characterizing physical properties, e.g. average particle size and/or density, it is possible to segregate or separate catalyst particles from inert particles in a fluidized bed separator. Consequently, separation of catalyst particles from inert particles in the fluidized bed separator makes it possible to selectively transfer catalyst particles to a regenerator vessel and inert particles to a combustion vessel. In accordance with this invention, one or more of the characterizing physical properties of the catalyst particles and the inert particles can be such that the catalyst particles will possess a settling rate $R_1$ and the inert particles will possess a different settling rate $R_2$, the difference between $R_1$ and $R_2$ being such that the two components may be readily separated in a fluidized bed separator.

A variety of techniques can be used to bring about a differential in the settling rate of the catalyst and the inert particles whereby the two types of particles may be easily separated. As a general guide, larger, more dense particles tend to migrate toward the lower section of a fluidized bed separator while smaller, less dense particles tend to migrate toward the upper section of a fluidized bed separator.

Among the techniques which can be used for making one catalyst component more dense than the other is compositing each catalyst with a matrix component of substantially different density. Useful matrix components include the following:

| matrix component | particle density (gm/cm$^3$) |
|---|---|
| alumina | 3.9–1.0 |
| silica | 2.2–2.6 |
| magnesia | 3.6 |
| beryllia | 4.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

As previously stated, the relative settling rate of each component can be selected by varying the average particle size of the inert material and the catalyst. As between two components of significantly different average particle size, the larger will tend to migrate to the lower section of a fluidized bed separator. Where it is desired to separate catalyst from inert particles in a fluidized bed separator by withdrawing catalyst from the top of the separator and inert particles from the bottom, the average particle size of the former will usually be smaller than that of the latter. So, for example, the average particle size of the inert particles can be made to vary from about 50 microns to about 7000 microns, and preferably from about 100 to about 2500 microns while the average particle size of the catalyst particles can be made to vary from about 20 to about 150 microns, and preferably from about 30 to about 70 microns.

As will be appreciated by those skilled in the art, the settling rate for a particular component is related to each of these two factors, i.e. density and average particle size. The factors can be combined in such a way that they each contribute to the desired result. For example, the inert particles can simultaneously be made denser and larger. However, a differential settling rate can still be provided even if one of the foregoing factors partially offsets another as would be the case where greater density and smaller average particle size coexist in the same catalyst particle. Regardless of how these factors of particle density and size are established for a particular component, their combined effect will, of course, be such as to result in a significant differential in settling rates of the inert and catalyst components comprising the system of this invention.

FLOW SCHEME FOR THE SECOND EMBODIMENT

Figure 2:
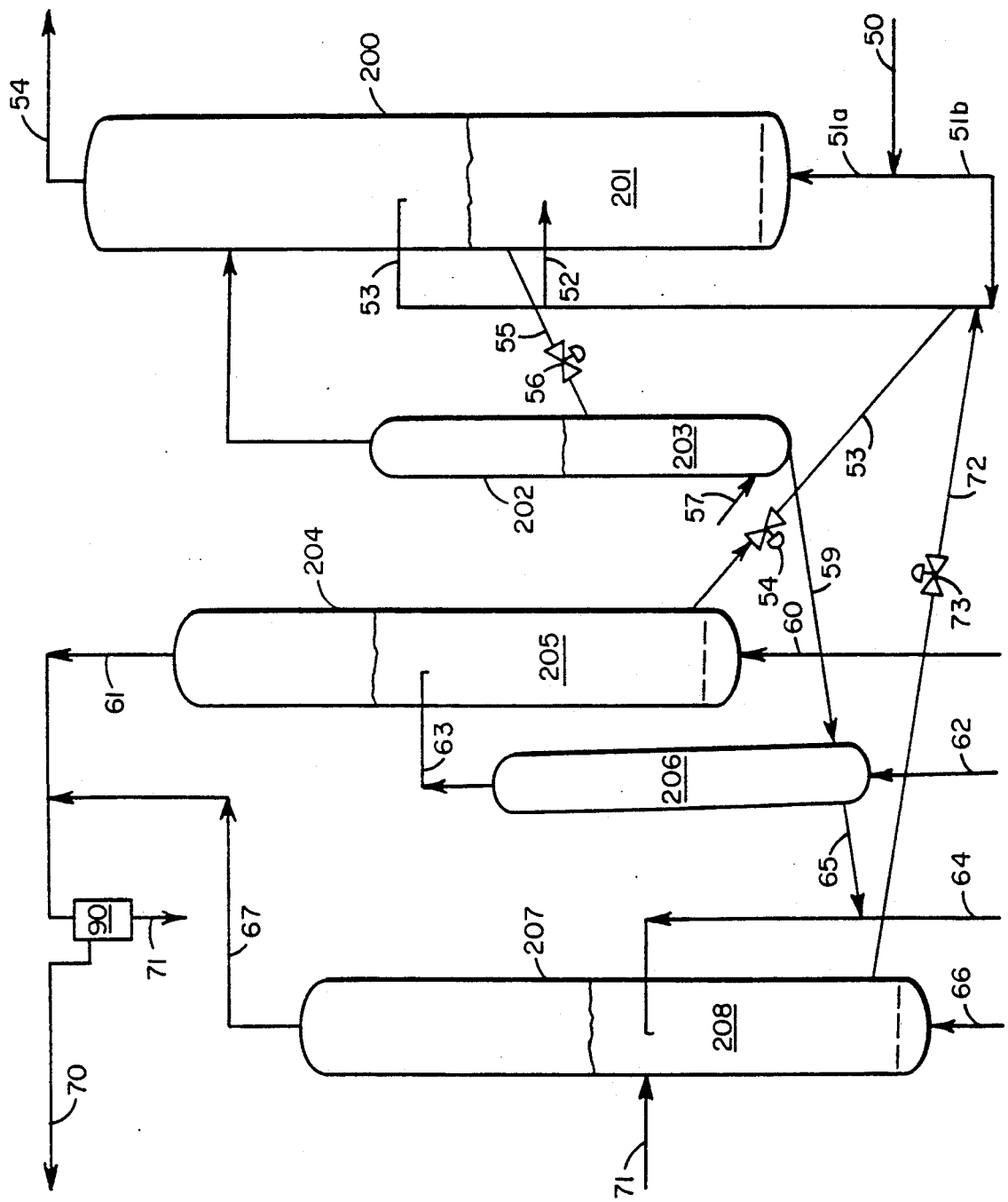
FIG. 2 is a simplified schematic diagram of a second embodiment of the present invention in which supplemental fuel is burned in a combustion vessel to heat inert particles while catalyst is regenerated in a separate regenerator vessel. The second embodiment includes separator means external to the regenerator.

Referring now to FIG. 2, a $C_2$-$C_5$ aliphatic hydrocarbon feedstream, as described above, is charged through line 50 to feed headers 51a and 51b. A portion of the feed from line 50 travels through feed header 51a into a dense bed of catalyst 201 in the bottom of reactor vessel 200. The balance of the feedstream flows through header 51b and is blended with a controlled amount of hot inert particles withdrawn from combustion vessel 207 flowing through line 72. Line 72 is equipped with flow control valve 73. The inert particles enter the feed header 51b at a temperature between about 540° C. and 760° C. (1000° F. and 1200° F.), preferably around 650° C. (1200° F.). Regenerated catalyst flows from regenerator 204 through line 53 which is equipped with flow control valve 54 and enters feed header 51b downstream from the junction between header 51b and line 72. The catalyst enters header 51b at a temperature between about 420° C. and 600° C. (800° F. and 1100° F.), preferably about 500° C. (950° F.). The preheated hydrocarbon vapor flows into reactor 200 through inlet nozzles 52 or 53. Inlet nozzle 52 injects the catalyst/feedstock mixture into the dense bed of fluidized catalyst 201. Inlet nozzle 53, on the other hand, injects the mixture into reactor 200 above the level of the dense bed 201.

Product flows out of reactor 200 through line 54 and is sent to a separation section for recovery of valuable products. Cyclone separators (not shown) may be positioned inside reactor 200 near the top to separate entrained catalyst from the reaction products. Sintered metal filters may also be installed in line 54 to further remove catalyst fines from the product stream.

Spent catalyst is withdrawn from reactor 200 via standpipe 55 which is equipped with a flow control valve 56. Withdrawn spent catalyst is charged to a dense bed of fluidized catalyst 203 in stripper 202. Inert gas, e.g. nitrogen, is charged to the bottom of stripper 202 through line 57 at a rate sufficient to maintain the mixture of catalyst and inert particles in a state of sub-transport fluidization. The stripped mixture of inert particles and catalyst is withdrawn from the bottom of stripper 202 and charged to separator 206 via line 59. A lift gas is charged to the bottom of separator 206 through line 62 at a rate sufficient to maintain the inert particles in a state of sub-transport fluidization while the catalyst particles are carried overhead and flow through line 63 to a dense bed 205 in the lower section of regenerator 204. Regeneration air is charged to the bottom of regenerator 204 via line 60. The lift gas charged to separator 206 is preferably a portion of the regeneration air drawn off from line 60 before entering regenerator 204.

Cyclone separators (not shown) may be positioned in the upper section of regenerator 204 to separate catalyst particles from flue gas. Flue gas is withdrawn from regenerator 204 through line 61 and flows to sintered metal filter 90 where catalyst fines entrained in the gas stream are removed. Filtered flue gas flows out of the sintered metal filter to a heat recovery section, e.g. steam generation, through line 70. Fines are removed through line 71.

Inert particles are withdrawn from the bottom of separator 206 through line 65. The inert particles flow into line 64 and are carried by a lift gas into a dense bed 208 maintained in the lower section of a combustion vessel 207. Supplemental fuel, preferably coke or charcoal, is charged to the dense bed 208 through line 71. Air is charged to the bottom of combustion vessel 207 through line 66. Charge rates of fuel and air are controlled to maintain the temperature in the combustion vessel between about 530° C. and 760° C. (1000° F. and 1400° F.).

Cyclone separators (not shown) may be positioned in the upper section of combustion vessel 207 to separate inert particles from flue gas. Flue gas is withdrawn from combustion vessel 207 through line 67, enters line 61, and is filtered in sintered metal filter 90 as described above.

FLOW SCHEME FOR THE THIRD EMBODIMENT

Figure 3:
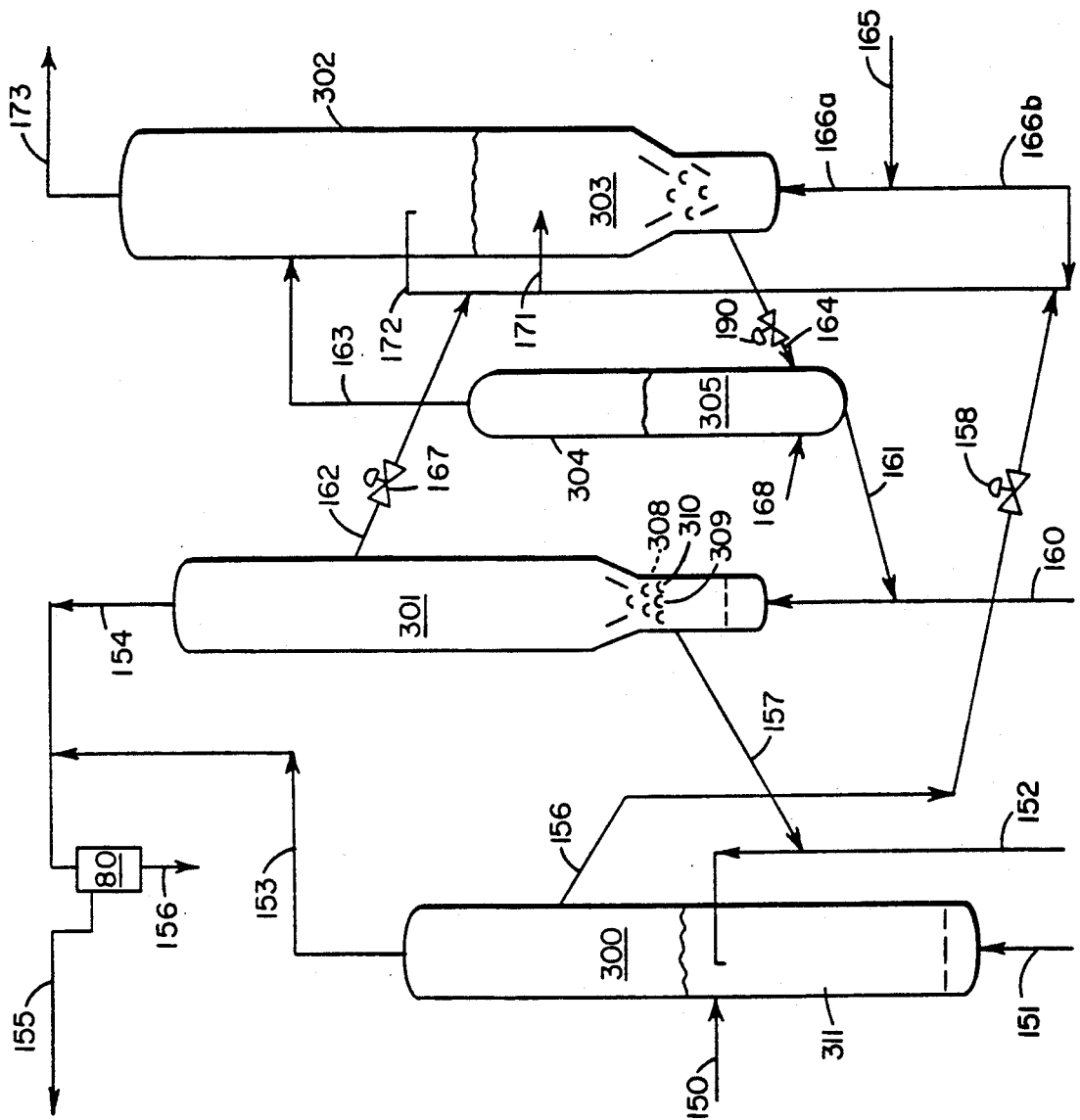
FIG. 3 is a simplified schematic diagram of a third embodiment of the present invention in which catalyst is separated from inert particles in a lower section of the regenerator vessel.

Referring now to FIG. 3, a $C_2$-$C_5$ aliphatic hydrocarbon feedstream, as described above, is charged through line 165 to feed headers 166a and 166b. A portion of the feed from line 165 travels through feed header 166a into a dense bed of catalyst 303 in the bottom of reactor vessel 302. The balance of the feedstream flows through header 166b and is blended with a controlled amount of hot inert particles flowing from line 156 which is equipped with flow control valve 158. The inert particles enter the feed header 166a at a temperature between about 540° C. and 760° C. (1000° F. and 1400° F.), preferably around 650° C. (1200° F.). Regenerated catalyst flows from regenerator 301 through line 162 which is equipped with flow control valve 167 and enters feed header 166b downstream from the junction between header 166b and line 156. The catalyst enters header 166b at a temperature between about 420° C. and 600° C. (800° F. and 1100° F.), preferably about 500° C. (950° F.). The vaporized hydrocarbon feed flows into reactor 302 through either of two inlet nozzles 171 or 172. Inlet nozzle 171 injects the catalyst/feedstock mixture into the dense bed of fluidized catalyst 303. Inlet nozzle 172, on the other hand, injects the mixture into reactor 302 above the level of the dense bed 303. Product flows out of reactor 302 through line 173 and is sent to a separation section for recovery of valuable products. Cyclone separators (not shown) may be positioned inside reactor 302 near the top to separate entrained catalyst from the reaction products. Sintered metal filters may also be installed in line 173 to further remove catalyst fines from the product stream.

Spent catalyst is withdrawn from reactor 302 via standpipe 164 which is equipped with a flow control valve 190. Withdrawn spent catalyst is charged to a dense bed of fluidized catalyst 305 in stripper 304. Inert gas is charged through line 168 to the bottom of stripper 304 at a rate sufficient to maintain the mixture of catalyst and inert particles in a state of sub-transport fluidization. The stripped mixture of inert particles and catalyst is withdrawn from the bottom of stripper 304 through line 161 and is charged to line 160. An oxygen-containing lift gas, e.g. air, flows through line 160 and carries the fluidized mixture upward into the separator section 308 of regenerator 301. The separator section 308 is fitted with a plurality of baffles 309 and 310 (only two are designated) to assist in separating the more easily fluidized catalyst particles from the larger and/or denser inert particles. The oxygen-containing lift gas is charged to the bottom of regenerator 301 through line 160 at a rate sufficient to maintain the inert particles in a state of sub-transport fluidization while the catalyst particles are carried upward through regenerator 301. Coke burns off the catalyst particles as they flow upward, fluidized in the stream of oxygen-containing lift gas.

Cyclone separators (not shown) may be positioned in the upper section of regenerator 301 to separate catalyst particles from flue gas. Flue gas is withdrawn from regenerator 301 through line 154 and flows to sintered metal filter 80 where catalyst fines entrained in the gas stream are removed. Filtered flue gas flows out of the sintered metal filter to a heat recovery section, e.g. steam generation, through line 155. Fines are removed through line 156.

Inert particles are withdrawn from separator section 308 through line 157. The inert particles flow into line 152 and are carried by a lift gas into a dense bed 311 maintained in the lower section of a combustion vessel 300. Supplemental fuel, preferably coke or charcoal, is charged to the dense bed 311 through line 150. Air is charged to the bottom of combustion vessel 300 through line 151. Charge rates of fuel and air are controlled to maintain the temperature in the combustion vessel between about 650° and 870° (1200° F. and 1600° F.), preferably about 760° C. (1400° F.).

Cyclone separators (not shown) may be positioned in the upper section of combustion vessel 300 to separate inert particles from flue gas. Flue gas is withdrawn from combustion vessel 300 through line 153, enters line 154 and is filtered in sintered metal filter 80 as described above.

FLOW SCHEME FOR THE FOURTH EMBODIMENT

Figure 4:
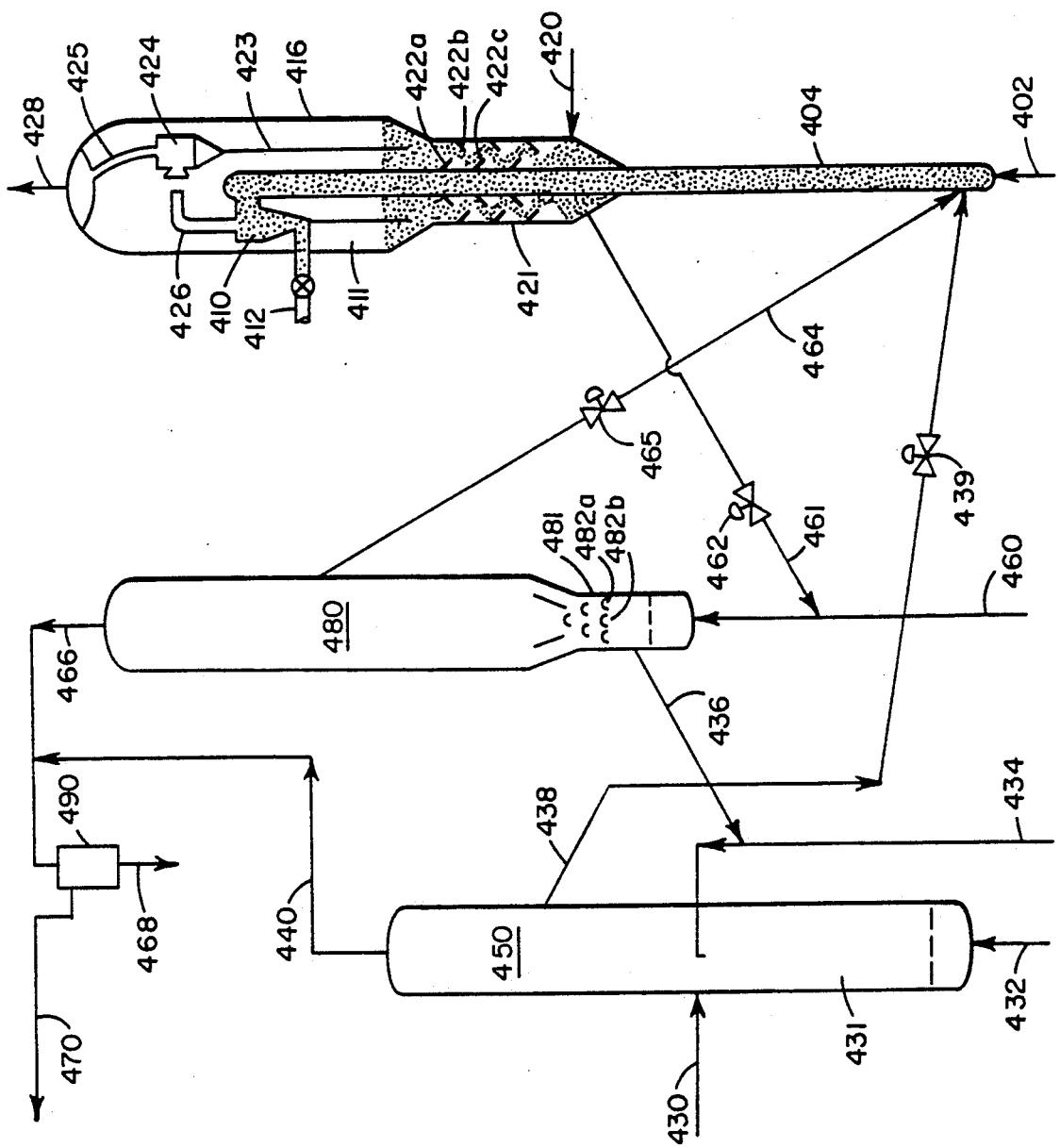
FIG. 4 is a simplified schematic diagram of a fourth embodiment of the present invention in which supplemental fuel is burned in the regenerator and the conversion reaction is carried out in a riser reactor.

Referring now to FIG. 4, an aliphatic hydrocarbon feedstream is charged through line 402 to the lower section of riser reactor 416. Hot regenerated catalyst from regenerator 480 enters the lower section of riser 404 through line 464 which is equipped with flow control valve 465. Hot inert particles from combustion zone 450 enter the lower section of riser 404 through line 438 which is equipped with flow control valve 439. The mixture of feedstock, catalyst and inert particles is transported upward through the riser as the feedstock is converted into a product stream with catalyst/feedstock contact times between about 1 and 20 seconds, preferably about 5 to 10 seconds.

The catalyst circulation rate is controlled to establish a catalyst to feedstock weight ratio of between about 0.5 and 50, preferably between about 5 and 15. For the purposes of defining catalyst circulation rate, the term "catalyst" is defined as a catalytically active component bound in an inert carrier. Catalyst circulation rate measures the weight per unit time of deactivated catalyst withdrawn from the reactor stripper section 421, oxidatively regenerated in regenerator 480 and returned to riser 404.

Inert particles are circulated to transfer heat from combustion zone 450 to the riser 404. The circulation rate is set to maintain the riser top temperature between about 510° and 870° C. (950° and 1600° F.), preferably between about 538° and 649° C. (1000° and 1200° F.). Pressure in the riser is maintained between 10 and 150 psig, preferably about 30 psig. The inert particle circulation rate is defined as the weight per unit time of inert particles circulated through the combustion zone 450 and charged to the rise 404.

Turning again now to the operation of the riser 404, the fluidized mixture of hydrocarbons, catalyst and inerts flows up the length of the riser 404 and is passed into one or more primary cyclones 410. Inert stripping gas, for example, nitrogen, may optionally be charged through line 412 to a point near the conical base of cyclone 410. Catalyst and inert particles are discharged through dipleg 411 into a dense bed of catalyst and inerts in the stripper section 421.

Reaction products with minor amounts of catalyst and inerts flow out of cyclone 410 through line 426 and pass to the inlet horn of secondary cyclone 424. Catalyst and inert particles are discharged through dipleg 423 into the dense bed in stripper section 421. Reaction products are withdrawn from cyclone 424 through line 425 and leave reactor vessel 416 through line 428. Sintered metal filters (not shown) may be optionally installed in line 428 to further separate entrained catalyst from the reaction products.

An inert stripping gas, for example, nitrogen, may be charged to stripping section 421 near the bottom through line 420. Frustoconical baffles 422a, 422b and 422c (only three are designated) are located in the stripping section 421 to enhance separation between the entrained reaction products and the mixture of catalyst and inert particles.

Spent catalyst is withdrawn from stripper section 421 via standpipe 461 which is equipped with a flow control valve 462. The withdrawn spent catalyst and inert particles flowing through line 461 are charged to line 460 where they are fluidized in a stream of oxygen-containing regeneration gas, typically air, and enter stripper 481 which is located in the lower section of regenerator vessel 480. Stripper 481 is equipped with a plurality of baffles 482a and 482b (only two are designated) which facilitate separation of the more easily fluidizable catalyst particles from the larger and/or denser inert particles. Deactivated catalyst flows upward through regenerator 480 where it is oxidatively regenerated as described above. Reactivated catalyst is withdrawn from regenerator 480 through standpipe 464 which is equipped with flow control valve 465 and flows back to the bottom of riser 404.

Cyclone separators (not shown) are positioned inside regenerator 480 near the top to separate catalyst from regenerator flue gas. Flue gas is withdrawn from regenerator 480 through line 466 and is charged together with combustion zone flue gas from line 440 to sintered metal filter 490. Purified flue gas is withdrawn from sintered metal filter 490 through line 470, while accumulated catalyst fines are discharged through line 468.

The heavier and/or denser inert particles are withdrawn from the lower section of stripper 481 through line 436 and are fluidized in a stream of oxygen-containing combustion gas flowing through line 434. The fluidized mixture enters a fluidized bed in the lower section 431 of combustion zone 450. Additional oxygen-containing combustion gas, typically air, is charged through line 432, while fuel, preferably a hydrogen-deficient fuel such as charcoal or coke, is charged to combustion zone 450 through line 430. Combustion zone 450 may be equipped with cyclone separators (not shown) to separate entrained inert particles from combustion zone flue gas which exits combustion zone 450 through line 440. Charge rates of fuel and air are controlled to maintain the temperature in the combustion zone between about 650° and 927° C. (1200° and 1700° F.), preferably about 760° C. (1400° F.). Hot inert particles are withdrawn from combustion zone 450 through line 438 and are charged to riser 404 as described above.

Changes and modifications in the specifically described embodiments can be carried out without departing from the scope of the invention which is intended to be limited only by the scope of the appended claims.

What is claimed is:

1. A process for the conversion of hydrocarbon feedstock comprising the steps of:
   (a) maintaining a reaction zone containing a fluidized bed of finely divided inert particles and finely divided zeolite catalyst particles at conversion conditions;
   (b) charging hydrocarbon feedstock to said reaction zone;
   (c) withdrawing a mixture of deactivated zeolite catalyst and inert particles from said reaction zone;
   (d) stripping entrained hydrocarbon from said mixture of step (c);
   (e) charging said stripped mixture of zeolite catalyst and inert particles of step (d) to a regeneration zone;
   (f) flowing a hydrogen-deficient supplemental fuel comprising coke or charcoal into said regeneration zone to minimize evolution of water upon combustion within said regeneration zone;
   (g) introducing a sufficient amount of oxygen into said regeneration zone to regenerate said deactivated zeolite catalyst of step (e) and to burn said hydrogen-deficient supplemental fuel of step (f) above;
   (h) withdrawing regenerated zeolite catalyst and inert particles from said regeneration zone; and
   (i) mixing said regenerated zeolite catalyst and said inert particles with said hydrocarbon feedstock.

2. The process of claim 1 wherein said zeolite has a Constraint Index of between about 1 and about 12.

3. The process of claim 2 wherein said zeolite has the structure of at least one of the group consisting of ZSM-5, ZSM-11, ZSM-12, ZSM-22, ZSM-23, ZSM-35 and ZSM-48.

4. The process of claim 3 wherein said zeolite has the structure of ZSM-5.

5. The process of claim 3 wherein said zeolite contains gallium.

6. The process of claim 1 wherein said hydrogen-deficient fuel comprises coke.

7. The process of claim 1 wherein said hydrogen-deficient fuel comprises charcoal.

8. The process of claim 1 wherein said catalyst comprises at least one metal selected from Groups IVA, VA, VIA, VIIA and VIIIA of the Periodic Table and said conversion conditions comprise dehydrogenation conversion conditions.

9. A process for the conversion of hydrocarbon feedstock comprising the steps of:
   (a) maintaining a reaction zone containing a fluidized bed of finely divided inert particles and finely divided zeolite catalyst particles at conversion conditions;
   (b) charging hydrocarbon feedstock to said reaction zone;
   (c) withdrawing a mixture of deactivated zeolite catalyst and inert particles from said reaction zone;
   (d) stripping entrained hydrocarbon from said mixture of step (c);
   (e) separating said stripped mixture of step (d) into a first stream predominately containing deactivated zeolite catalyst and a second stream predominately containing inert particles;
   (f) charging said first stream predominately containing deactivated zeolite catalyst of step (e) above to a regeneration zone;
   (g) introducing an amount of oxygen-containing gas into said regeneration zone sufficient to regenerate the deactivated catalyst of step (f) above and to maintain the catalyst in a state of sub-transport fluidization;
   (h) charging said second stream predominately containing inert particles of step (e) above to a combustion zone;
   (i) flowing a hydrogen-deficient supplemental fuel comprising coke or charcoal into said combustion zone to minimize evolution of water upon combustion within said combustion zone;
   (j) heating said inert particles of step (h) above in said combustion zone by introducing an amount of an oxygen-containing gas into said combustion zone sufficient to maintain inert particles in a state of sub-transport fluidization and to burn the hydrogen-deficient supplemental fuel of step (i) yielding an oxygen-containing flue gas;
   (k) withdrawing said regenerated zeolite catalyst from said regeneration zone;
   (l) withdrawing said heated inert particles from said combustion zone;
   (m) mixing said regenerated zeolite catalyst with said hydrocarbon feedstock; and
   (n) mixing said heated inert particles with said hydrocarbon feedstock.

10. The process of claim 9 wherein said zeolite has a Constraint Index of between about 1 and about 12.

11. The process of claim 10 wherein said zeolite has the structure of at least one of the group consisting of ZSM-5, ZSM-11, ZSM-12, ZSM-22, ZSM-23, ZSM-35 and ZSM-48.

12. The process of claim 11 wherein said zeolite has the structure of ZSM-5.

13. The process of claim 11 wherein said zeolite contains gallium.

14. The process of claim 9 wherein said hydrogen-deficient fuel comprises coke.

15. The process of claim 9 wherein said hydrogen-deficient fuel comprises charcoal.

16. The process of claim 9 wherein said catalyst comprises at least one metal selected from Groups IVA, VA, VIIA and VIIIA of the Periodic Table and said conversion conditions comprise dehydrogenation conversion conditions.

17. A process for the conversion of hydrocarbon feedstock comprising the steps of:
   (a) maintaining a reaction zone containing a mixture of finely divided inert particles and finely divided zeolite catalyst particles fluidized in a transport regime under conversion conditions;

(b) charging hydrocarbon feedstock to said reaction zone;
(c) withdrawing a mixture of deactivated zeolite catalyst and inert particles from said reaction zone;
(d) stripping entrained hydrocarbon from said mixture of step (c);
(e) separating said stripped mixture of step (d) into a first stream predominately containing deactivated zeolite catalyst and a second stream predominately containing inert particles;
(f) charging said first stream predominately containing deactivated zeolite catalyst of step (e) above to a regeneration zone;
(g) introducing an amount of oxygen-containing gas into said regeneration zone sufficient to regenerate the deactivated zeolite catalyst of step (f) above and to maintain the catalyst in a state of sub-transport fluidization;
(h) charging said second stream predominately containing inert particles of step (e) above to a combustion zone;
(i) flowing hydrogen-deficient supplemental fuel comprising coke or charcoal into said combustion zone to minimize evolution of water upon combustion within said combustion zone;
(j) heating said inert particles of step (h) above in said combustion zone by introducing an amount of an oxygen-containing gas into said combustion zone sufficient to maintain said inert particles in a state of sub-transport fluidization and to burn said hydrogen-deficient supplemental fuel of step (i) yielding an oxygen-containing flue gas;
(k) withdrawing said regenerated zeolite catalyst from said regeneration zone;
(l) withdrawing said heated inert particles from said combustion zone;
(m) mixing said regenerated catalyst with said hydrocarbon feedstock; and
(n) mixing said heated inert particles with said hydrocarbon feedstock.

18. The process of claim 17 wherein said zeolite has a Constraint Index of between about 1 and about 12.

19. The process of claim 17 wherein said zeolite has the structure of at least one of the group consisting of ZSM-5, ZSM-11, ZSM-12, ZSM-22, ZSM-23, ZSM-35 and ZSM-48.

20. The process of claim 19 wherein said zeolite has the structure of ZSM-5.

21. The process of claim 19 wherein said zeolite contains gallium.

22. The process of claim 17 wherein said hydrogen-deficient fuel comprises coke.

23. The process of claim 17 wherein said hydrgoen-deficient fuel comprises charcoal.

24. The process of claim 17 wherein said catalyst comprises at least one metal selected from Groups IVA, VA, VIA, VIIA and VIIIA of the Periodic Table and said conversion conditions comprise dehydrogenation conversion conditions.

* * * * *